(12) United States Patent
Hehl, Sr.

(10) Patent No.: US 8,371,423 B2
(45) Date of Patent: Feb. 12, 2013

(54) BRAKING OR CLUTCHING DEVICE

(75) Inventor: John F. Hehl, Sr., Delevan, NY (US)

(73) Assignee: American Precision Industries, Inc., Amherst, NY (US)

( * ) Notice: Subject to any disclaimer, the term of this patent is extended or adjusted under 35 U.S.C. 154(b) by 344 days.

(21) Appl. No.: 12/717,619

(22) Filed: Mar. 4, 2010

(65) Prior Publication Data

US 2010/0155189 A1    Jun. 24, 2010

Related U.S. Application Data

(63) Continuation of application No. 11/742,185, filed on Apr. 30, 2007, now Pat. No. 7,717,241, which is a continuation-in-part of application No. 11/415,263, filed on May 1, 2006, now abandoned.

(51) Int. Cl.
*F16F 15/03* (2006.01)
(52) U.S. Cl. ........................................ 188/267; 188/71.5
(58) Field of Classification Search .................. 188/71.5, 188/163, 161, 171, 267, 264 B, 264 R, 251 A
See application file for complete search history.

(56) References Cited

U.S. PATENT DOCUMENTS

| | | | |
|---|---|---|---|
| 2,378,108 A | 6/1945 | Ryba | |
| 2,597,388 A | 5/1952 | Lavaud | |
| 3,268,044 A | 8/1966 | Lippman | |
| 3,422,942 A | 1/1969 | Spencer | |
| 3,446,322 A | 5/1969 | Wrench | |
| 3,734,245 A | 5/1973 | Hubbard | |
| 3,789,966 A | 2/1974 | Miller | |
| 3,899,061 A | 8/1975 | Krug | |
| 4,201,281 A | 5/1980 | MacDonald | |
| 4,353,586 A | 10/1982 | Raquet et al. | |
| 4,392,681 A | 7/1983 | Raquet | |
| 4,567,975 A | 2/1986 | Roll | |
| 4,717,865 A | 1/1988 | Caputo | |
| 4,938,321 A * | 7/1990 | Kelley et al. | 188/171 |
| 4,951,797 A | 8/1990 | Booth et al. | |
| 4,982,825 A * | 1/1991 | Sekella | 188/161 |
| 4,997,067 A * | 3/1991 | Watts | 188/251 A |
| 5,121,018 A | 6/1992 | Oldakowski | |
| 5,185,542 A | 2/1993 | Lazorchak | |
| 5,603,395 A * | 2/1997 | Mabee | 188/71.5 |
| 5,686,144 A | 11/1997 | Thebault et al. | |
| 6,405,837 B1 | 6/2002 | Muramoto | |
| 6,603,307 B2 | 8/2003 | Seklya | |
| 6,789,456 B2 | 9/2004 | DeRoos | |
| 6,854,573 B2 | 2/2005 | Jolly et al. | |
| 6,868,948 B2 | 3/2005 | Landrieve | |

(Continued)

FOREIGN PATENT DOCUMENTS

| | | |
|---|---|---|
| DE | 2601121 A1 | 7/1976 |
| DE | 2616393 A1 | 3/1977 |

(Continued)

OTHER PUBLICATIONS

European Search Report Dated Feb. 22, 2011 EP 94300857.

*Primary Examiner* — Melanie Torres Williams
(74) *Attorney, Agent, or Firm* — Cantor Colburn LLP

(57) ABSTRACT

An electric braking or clutching device includes a housing; an armature having an axis and disposed at the housing, the armature and the housing defining a radial air gap therebetween; and a coil configured to generate, when energized, a magnetic field at the housing and armature, a flux path of the field extending from the coil into the housing, from the housing into the armature, from the armature into the housing, and from the housing back to the coil, with the direction of the flux path from the armature into the housing being substantially radial in orientation.

10 Claims, 5 Drawing Sheets

U.S. PATENT DOCUMENTS

| | | |
|---|---|---|
| 7,140,475 B1 | 11/2006 | Appelqvist |
| 7,625,030 B2 | 12/2009 | Bieker et al. |
| 2004/0256192 A1 | 12/2004 | Hill et al. |

FOREIGN PATENT DOCUMENTS

| | | |
|---|---|---|
| DE | 2903362 A1 | 7/1980 |
| DE | 2638944 A1 | 2/1984 |
| DE | 3434116 A1 | 3/1986 |
| DE | 102005042593 A1 | 3/2006 |
| DE | 202006000469 U1 | 3/2006 |
| EP | 0611114 A1 | 8/1994 |
| EP | 0793034 A2 | 3/1997 |
| EP | 0816126 A1 | 1/1998 |
| EP | 0793034 B1 | 4/2001 |
| GB | 2021501 A | 12/1979 |
| GB | 2027844 A | 2/1980 |
| GB | 2390885 | 1/2004 |

\* cited by examiner

US 8,371,423 B2

BRAKING OR CLUTCHING DEVICE

CROSS-REFERENCE TO RELATED APPLICATIONS

This application is a continuation of U.S. application Ser. No. 11/742,185, which was filed Apr. 30, 2007 now U.S. Pat. No. 7,717,241 and which is incorporated by reference herein in its entirety, that application itself being a continuation-in-part of U.S. application Ser. No. 11/415,263, filed May 1, 2006 now abandoned, which is also incorporated by reference herein in its entirety.

BACKGROUND

Devices used for braking or clutching are common in industry. It is often desirable to selectively control speed or torque of a rotatable component of a device or to selectively engage a rotatable component. Such devices are utilized in industry for many and varied applications including actuators in assembly lines, automated systems, etc.

Currently, braking and clutching duties are handled by devices including magnetorheological fluid based devices and spring-based devices. While commercially available devices generally operate as marketed and are effective for some applications, they are expensive, lack adjustability, or both.

Since greater economy and adjustability are always desirable, improvements are always well received.

SUMMARY OF THE INVENTION

An electric braking or clutching device includes a housing; an armature having an axis and disposed at the housing, the armature and the housing defining a radial air gap therebetween; and a coil configured to generate, when energized, a magnetic field at the housing and armature, a flux path of the field extending from the coil into the housing, from the housing into the armature, from the armature into the housing, and from the housing back to the coil, with the direction of the flux path from the armature into the housing being substantially radial in orientation.

A braking or clutching device includes a first plurality of discs rotationally fixed to one of a housing or a shaft; and at least one second disc interengaged with the first plurality of discs and rotationally fixed to the other of the housing or the shaft, at least one of the first plurality of discs and the at least one second disc presenting a contact surface, for contact with another of the first plurality of discs and at least one second disc, the surface comprising a low friction bearing material having a kinetic coefficient of friction substantially the same as its static coefficient of friction.

A magnetically actuable device includes a housing; and an armature disposed at the housing and axially movable relative to the housing, the device having a substantially uniform magnetic actuation force sustainable through a majority of an axial movement of the device irrespective of wear of the device.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE DRAWINGS

Figure 1:
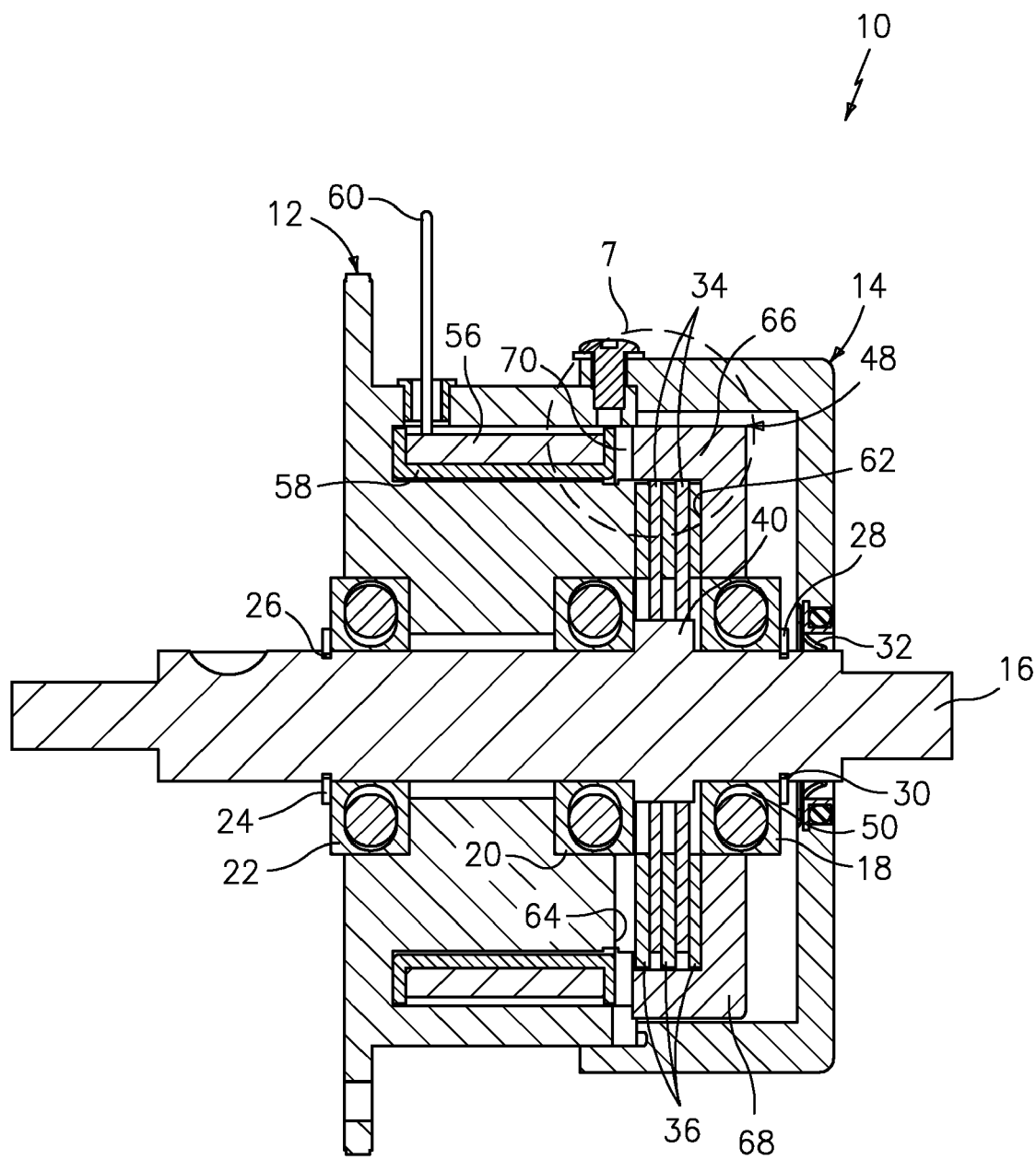
FIG. 1 is a cross section view of a selective engagement device.
Figure 1A:
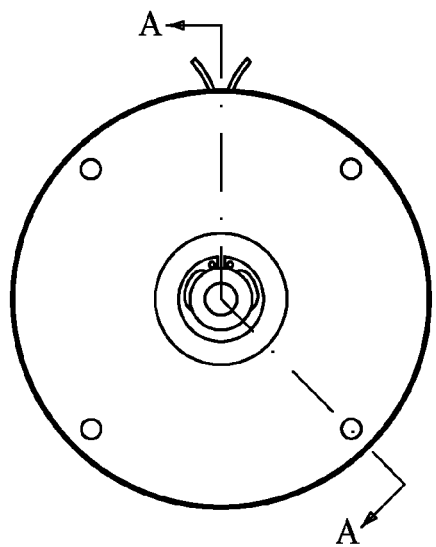
FIG. 1a is a plan view of the device illustrating the section line for FIG. 1.

Prior to discussing the figures, it is important to point out that although the drawings and description hereof are directed to a device where the housing is outwardly adjacent the armature, the concepts disclosed herein are applicable to the housing being inwardly adjacent the armature. The armature may also be adjacent the housing in a sideways manner. Referring to FIG. 1, a selective engagement device 10 is generally depicted in cross section. It is important to note that the section line as depicted is not a diametral line but rather is that illustrated in FIG. 1a. The device includes a coil housing 12 and cover 14. Supported within the coil housing 12 and cover 14 are a rotary shaft 16 supported by bearings 18, 20 and 22. A retention ring 24 is positionable in a groove 26 adjacent to bearing 22 while retention ring 28 is positioned in groove 30 adjacent bearing 18 to retain the shaft 16 in its desired position relative to the housing 12 and cover 14. Further provided is a seal 32 to maintain the environment internal to housing 12 and cover 14.

Figure 2:
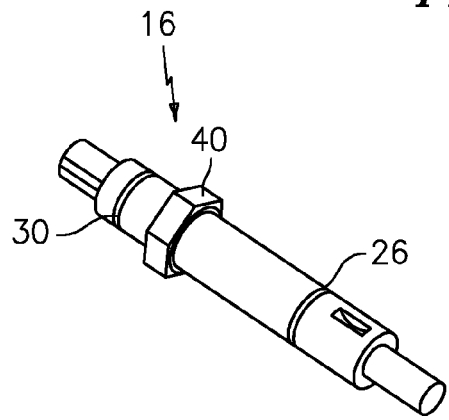
FIG. 2 is a perspective view of a shaft of the device.

A plurality of friction disks 34 (a circular limitation is not intended by the term "disk" but rather any desired perimetrical shape may be used) is positioned, in alternating manner, with a plurality of thrust washers 36. In the illustrated embodiment, there are shown two friction disks and three thrust washers. It will be understood however that the number of disks and thrust washers is not limited to that shown but that more or fewer could be utilized in particular applications, even including none. If none is desired, then in one embodiment the housing surface facing the armature and the armature surface opposing the identified housing surface will be hardened or otherwise treated to prolong wear resistance. Returning to the illustrated embodiment, the friction disks 34 are driven by (or drive through) shaft 16 in one embodiment through the use of a hexagonal opening 38 (see FIG. 6) complimentary to a hexagonal drive profile 40 (see FIG. 2) on shaft 16. It is to be appreciated that while a hexagonal drive shape has been employed in the embodiment illustrated, any geometric shape having sufficient drive capability for the application is substitutable for the hexagonal shape. This includes a splined connection, should one be desirable. Functionality is provided by the disks being driven at the axis thereof as will become more apparent hereinafter. The plurality of thrust washers 36, on the other hand are configured to clear drive profile 40 with an opening 42 that is simply large enough to not engage whatever geometric profile is utilized for profile 40 (see FIG. 4), the point in this instance being that the thrust washers are to be rotatable relative to the shaft and friction disks or the shaft (and frictions disks) be rotatable relative to the washers. The thrust washers 36 include engagement tabs 44, which in one embodiment number four, evenly spaced around each thrust washer 36. Tabs 44 are intended to be engaged by at least one recess 46 in an armature 48 (see FIG. 3, four shown). The tabs engaged with recesses 46 prevent relative rotational motion between the washers and the armature.

Figure 3:
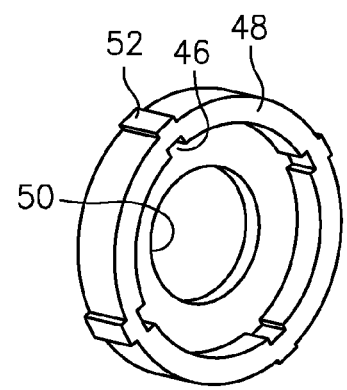
FIG. 3 is a perspective view of an armature of the device.
Figure 4:
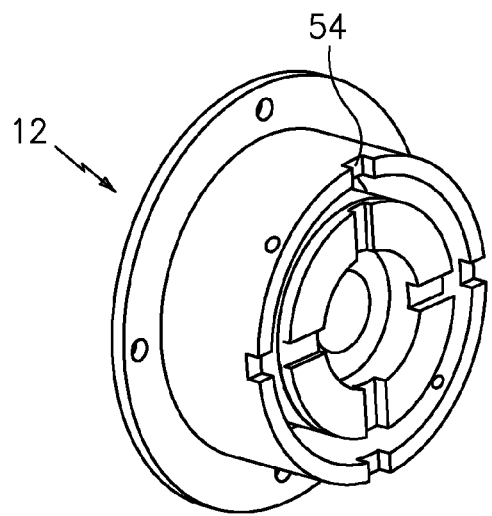
FIG. 4 is a perspective view of a housing of the device.

Armature 48 includes a bearing opening 50 in which bearing 18 is received to support armature 48, although it is to be understood that the bearing depicted is optional and existing in the illustrated embodiment but could be eliminated in alternate embodiments without effect on operation of the device as herein disclosed. Armature 48 is axially displaceable along bearing 18 such that it may be actuated against the thrust washers and friction disks when it is desired to slow or stop relative rotation between shaft 16 and the housing and cover 12, 14. In one embodiment, it is necessary that the armature not have relative rotational motion capability with respect to the housing 12. Thus, as illustrated in FIG. 3, armature 48 is provided with engagement risers 52. Four risers 52 are illustrated although more or fewer could be used. In the illustrated embodiment, using four risers 52 and four recesses 46 maintains annular thickness of the armature 48.

Figure 5:
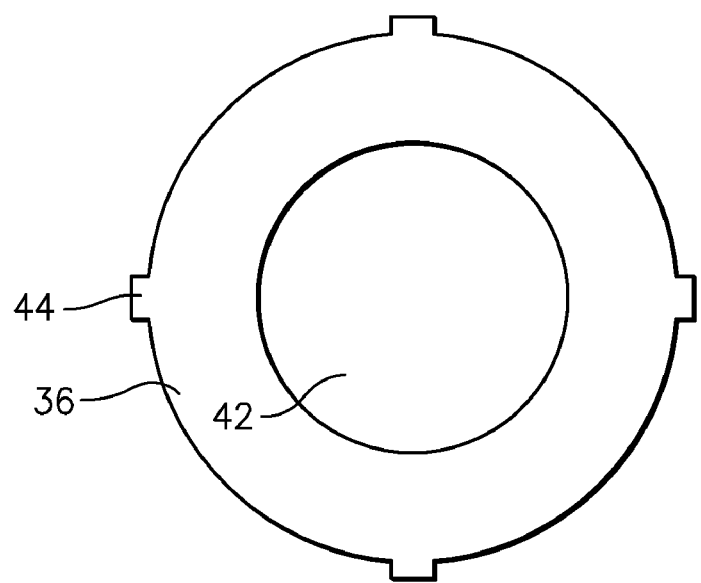
FIG. 5 is a plan view of a thrust washer of the device.
Figure 6:
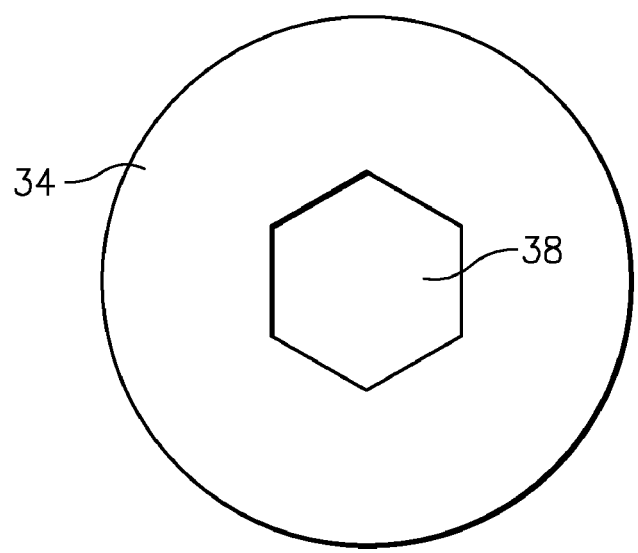
FIG. 6 is a plan view of a friction disk of the device.

Referring to FIGS. 5 and 6, the disks 34 and washers 36 are illustrated apart from other structures. The washer tabs 44 as noted are intended to engage in recesses 46 for a non-rotational engagement with armature 48. To complete the nonrotational engagement from the washers 36 to housing 12, the risers 52 engage grooves 54 (illustrated in FIG. 4). With this arrangement, the washers 36 are substantially rotationally immobile relative to the housing 12, which facilitates the purpose of the device. It will be understood that this is but one possibility of an arrangement for antirotation between the washers and armature, others functionally equivalent are substitutable as desired.

With the washers 36 immobile and the friction disks 34 sandwiched between the washers 36 (and configured to rotate with the shaft 16) the friction disks must slide past the washers 36. Because of this arrangement, if a compressive load is applied to the washers/disks, the effective total friction rises and relative motion between the washers and disks reduces or stops. Such inhibition of relative motion may be used for braking or clutching in various applications. The impetus for the compressive load in the depicted embodiment is an electromagnetic attractive force generated between the housing 12 and the armature 48. It is noted here that a specific relationship for the armature and housing is disclosed herein that causes a flux path of the device to be unique and as a consequence causes the air gap between the housing and armature to remain constant throughout the service life of the device irrespective of wear of the device and without need for adjustment of any kind. This will be detailed hereunder.

Figure 7:
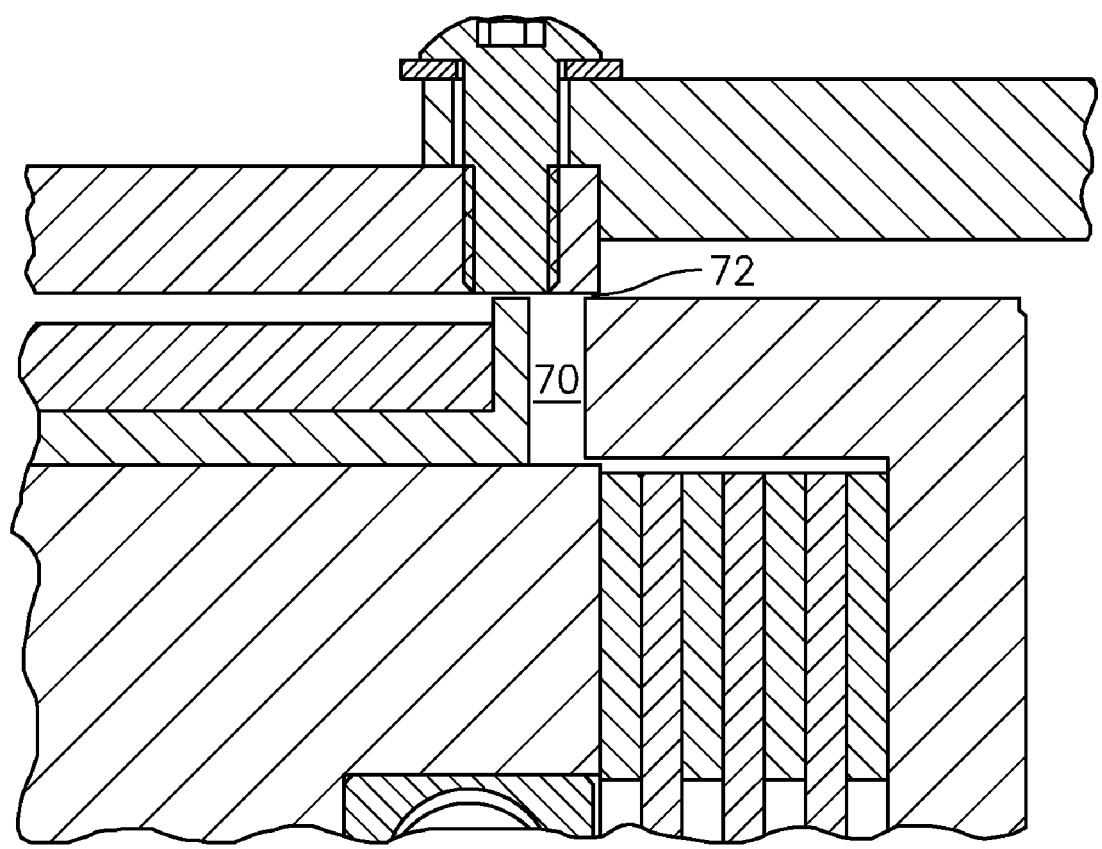
FIG. 7 is an enlarged view of circumscribed area 7-7 in FIG. 1.
Figure 8:
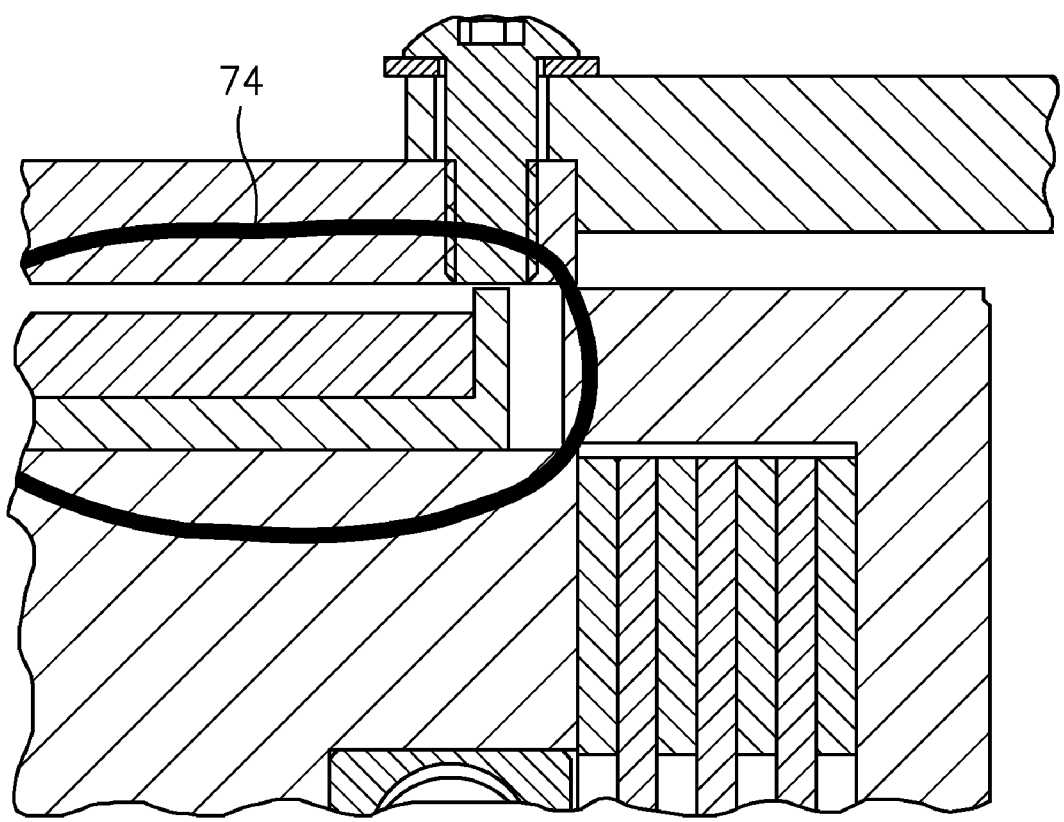
FIG. 8 is the view of FIG. 7 with the flux path illustrated by a heavy black line.

A coil 56, as illustrated in FIG. 1, generates the electromagnetic force. The coil 56 is cradled in a bobbin 58 disposed within housing 12. One lead 60 (of two, the other not being visible in this view), electrically connected to the coil 56 is illustrated in FIG. 1 for clarity. Coil 56 becomes magnetically active when a current is applied thereto. The magnetic properties of coil 56 are utilized to draw armature 48 towards the coil 56 thereby compressing thrust washers 36 and friction disks 34 between an inside surface 62 of armature 48 and a housing surface 64. Compression of washers 36 and disks 34 creates significant friction to be utilized in retarding relative rotation between shaft 16 and housing 12, as noted above. The device disclosed herein provides for a significantly longer life than prior art devices as it is capable of about forty-thousandths to about fifty-thousandths of an inch of wear in the friction generating members before losing selective braking or clutching power whereas the prior art is merely capable of ten thousandths of an inch of wear. The invention accomplishes this desirable result by causing the magnetic flux path of the device to flow from coil 56 to armature 48 and then to the housing in a direction substantially radial in orientation rather than axially (of the device) through the air gap between the housing and armature. This is contrary to what clutching and braking devices have done in the past. The creation of the radial flux path is occasioned by the addition to the armature 48 of a portion thereof radially concentrically positioned relative to a portion of the housing, such as a ring of material 66 positioned to extend from a planar portion 68 of armature 48 into an annular space 70 within which bobbin 58 and coil 56 are disposed. The ring 66, because it extends into the space 70 by a small amount, while providing a radial air gap 72 between the housing 12 and the armature 48, physically causes the flux path to flow substantially radially as opposed to axially from the armature 48 to the housing 12, as it does in the prior art. The arrangement provides for a lower total magnetic force on the armature but one that is consistent over a longer range. More specifically, the device exhibits a substantially uniform magnetic actuation force sustainable through a majority of an axial movement of the device irrespective of wear of the device. Stated alternately, the prior art suffers a reduction in the magnetic actuation force as the discs and washers wear due to ordinary use of the device. In the present invention, the wear of these items does not affect the magnetic actuation force to any appreciable degree. This is what provides the benefit of the greater wear tolerance in the present arrangement. It is the air gap 72 between the housing 12 and the armature 48, because it is radially oriented that is responsible for the benefit. The air gap is not in a wear path of the device (the wear path being axial due to frictional wear of the disks and washers in an axial direction). The gap 72 therefore does not change in dimension but remains consistent regardless of the wear in the friction disks 34. Prevention of change in the dimension of the air gap 72 through which the flux passes contributes to the steady force generated over the life of the device (e.g. between about 0.020 inch and 0.070 inch of axial wear in the device. Referring to FIG. 7, an enlarged view of a portion of FIG. 1 allows for illustration of the air gap 72. The flux path through the air gap is illustrated in FIG. 8 by a heavy black line 74.

Providing further benefit to the devices disclosed herein is the additional teaching hereof that the disks and washers in a clutching or braking system may be constructed at least partially of torque transfer materials having a kinetic coefficient of friction substantially the same as its static coefficient of friction or within about plus or minus 5 percent of 1:1. It is to be understood however that although benefit of the invention diminishes with increasing disparity between the kinetic coefficient of friction and the static coefficient of friction, benefits hereof are still largely exhibited up to about 20 percent difference. In one embodiment, the material is a bearing material of nylon with a PTFE (Polytetrafluoroethylene) or other low friction additive and exhibits a ratio of static coefficient of friction to kinetic coefficient of friction of about 1.05. It is further to be noted that while the foregoing disclosure relates in large part to an electromagnetic device, the utilization of a torque transfer material having the stated range of ratio of static to kinetic coefficient of friction is not restricted to electrically or magnetically actuable devices but may be employed in any clutching or braking device for torque transfer. This includes but is not limited to hydraulically actuable devices, mechanically actuable devices pneumatically actuable devices, etc. The property as stated, and as is implied by the statement itself, means that there is very little "stick-slip" action in the system of the invention. As an astute reader might posit, such properties also indicate a relatively low production of usable friction. While this condition might be considered questionable for a clutching/braking device, the benefits of avoidance of "stick-slip" are more important. This is especially the case in view of the fact that the loss in overall friction in the system can be easily compensated for by increasing the radial distance from the axis of the device to the friction surface, increasing the frictional area, or increasing the number of frictional interfaces (disks and washers) in the system. It is also contemplated to use more than one of these compensating arrangements together in some applications.

The device as detailed hereinabove provides not only for greater wear tolerance in use but also allows for selectivity in the amount of braking force or clutching engagement it will impart to a particular system. This benefit is occasioned by the fact that the device is ultimately controlled by the amount of current put to the coil 56. The greater the current applied to the coil, the greater the magnetic field generated thereby. The greater the magnetic field the stronger the pull on the armature, and consequently the greater the compression of the friction disks. The amount of friction generated between the thrust washers and friction disks therefore can be varied as a function of the applied current.

It is noted that the above-described embodiment is one possible embodiment utilizing the radial air gap and flux path disclosed. It should also be appreciated however that the essential features of this concept, i.e. braking or clutching can also be carried out using the radial air gap and flux path but without utilizing friction disks or thrust washers. In such embodiment, the armature would be rotatable relative to the housing when the coil was not energized and would be pulled into frictional contact with the housing when the coil is energized. This would promote wear of the housing and the armature but with suitable selection of materials, the device would work acceptably.

It is to be understood that the braking or clutching device as disclosed herein is not limited to industrial applications. Rather the device is useful for many different applications where selectively actuably torque transfer is desirable or useful. These include arrangements such as a human tactile interface arrangements, responsive to a control algorithm, employed in devices such as video games where tactile feedback is useful to enhance the gaming experience. Moreover, the torque transfer devices disclosed herein are useful in steer by wire applications in order to provide tactile feedback to a pilot of a plane, boat or motor vehicle. Further the devices disclosed herein are useful for tensioning systems where a sensor system is configured to sense tension in, for example, a web and provide sensory information to a controller that then actuates a braking of clutching device provided in the system to modify the tension in the web. Yet still the devices disclosed herein are useful in variable torque proportioning devices, etc. In short, the devices as disclosed herein are applicable to any system wherein control over torque transfer is useful.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A braking/clutching device providing a tactile operating sensation free of stick-slip action, the device comprising:
    a housing having a longitudinal axis;
    a generally annular armature mounted for movement relative to the housing in a direction generally along the longitudinal axis of the housing;
    a shaft mounted in the housing for rotation relative to the housing and the armature, and adapted to be rotated around the longitudinal axis by manual operation applied by a human operator;
    a first set of disks rotationally fixed relative to the housing, but free to move longitudinally with respect to the housing;
    a second set of disks rotationally fixed relative to the shaft, but free to move longitudinally with respect to the shaft, with the disks of the second set of disks being interleaved between the disks of the first set of disks; and
    an electro-magnetic coil connected to the housing and configured to selectively generate a magnetic field for moving the armature longitudinally relative to the housing to hold the first and second set of disks in frictional sliding engagement, with the level of force applied for holding the disks together being a function of the strength of the magnetic field generated by the coil;
    with a flux path of the magnetic field generated by the coil extending from the coil to the armature, from the armature to the housing and from the housing back to the coil, with the flux path of the magnetic field being spaced apart from and not extending through the first and second set of disks;
    with at least one of the first and second sets of disks presenting a contact surface comprising a bearing material having a relatively low coefficient of friction and a kinetic coefficient of friction that is substantially the same as its static coefficient of friction; and
    with the braking/clutching device providing a tactile sensation free of stick-slip action when the sets of disks are held in frictional sliding engagement and the shaft is rotated within the housing away from a first stationary annular position to second stationary annular position spaced from the first.

2. The braking/clutching device of claim 1, wherein the value of the kinetic coefficient of friction and the value of the static coefficient of friction are within 20% of each other.

3. The braking/clutching device of claim 1, wherein the value of the kinetic coefficient of friction and the value of the static coefficient of friction are within 5% of each other.

4. The braking/clutching device of claim 1, wherein the contact surfaces comprise nylon with a polytetrafluoroethylene additive.

5. The braking/clutching device of claim 1, wherein each disk of the first set of disks comprises at least one portion at an outer edge thereof engageable with the armature for transferring force applied to the disk at its surface engaged by an adjacent disk of the second set of disks to the armature.

6. The braking/clutching device of claim 1, wherein each disk of the second set of disks comprises at least one portion at an inner edge thereof engageable with the shaft for transferring force applied to the disk at its surface engaged by an adjacent disk of the first set of disks to the shaft.

7. The braking/clutch device of claim 1, wherein the contact surface is presented by an engaging surface of each of the disks.

8. The braking/clutching device of claim 1, wherein the disks of said at least one of the first and second set of disks comprises a non-ferrous material.

9. The braking/clutching device of claim 8, wherein the disks of said at least one of the first and second set of disks comprises a synthetic material.

10. The braking/clutching device of claim 9, wherein the disks of said at least one of the first and second set of disks comprises nylon with a polytetrafluoroethylene additive.

* * * * *